United States Patent [19]

Richter

[11] Patent Number: 4,759,484

[45] Date of Patent: Jul. 26, 1988

[54] PRINTING FORM FEEDER DEVICE AND METHOD

[76] Inventor: James R. Richter, 848 W. Wisconsin, Chicago, Ill. 60614

[21] Appl. No.: 769,387

[22] Filed: Aug. 26, 1985

Related U.S. Application Data

[63] Continuation of Ser. No. 523,113, Aug. 15, 1983, abandoned.

[51] Int. Cl.[4] ........................ B32B 3/04; B32B 31/00; B42D 19/00; B65H 20/20

[52] U.S. Cl. ........................................ 226/6; 156/216; 156/264; 226/92; 281/2

[58] Field of Search .................... 226/6, 52, 53, 74, 76, 226/77, 82, 92; 156/201, 202, 216, 264, 289, 510, 157, 505; 281/1, 2, 5; 282/11.5 A, 11.5 R, 15 A, DIG. 2

[56] References Cited

U.S. PATENT DOCUMENTS

| | | | |
|---|---|---|---|
| 3,716,444 | 2/1973 | Hanke | 156/505 |
| 3,788,536 | 1/1974 | Brown | 226/91 |
| 3,874,276 | 4/1975 | Froehlig | 156/216 X |
| 4,070,223 | 1/1978 | Stalzer | 226/6 X |
| 4,240,867 | 12/1980 | Diegel | 156/216 X |
| 4,285,531 | 8/1981 | Balsamo | 281/5 |
| 4,329,191 | 5/1982 | Barber | 156/216 X |
| 4,448,558 | 5/1984 | Weingarten | 282/11.5 A X |
| 4,588,463 | 5/1986 | Barber et al. | 156/216 X |

*Primary Examiner*—Stanley N. Gilreath
*Assistant Examiner*—Lynn M. Sohacki
*Attorney, Agent, or Firm*—William E. Dominick

[57] ABSTRACT

An article for feeding into a mechanical printer the uppermost form of a continuous assembly of forms having lateral marginal sections with spaced holes coinciding with the spacing of the feed pins of the feed mechanism of the mechanical printer comprising an elongated narrow flexible strip foldable down the middle and having oppositely disposed holes in each folded half longitudinally spaced to coincide with the feed pin holes in the uppermost form and having one surface of the strip coated with a pressure sensitive adhesive film; said flexible strip adapted to be mounted on the marginal sections of the uppermost form with the holes therein aligned with the holes in the marginal section and secured to the marginal sections of said uppermost form so that the uppermost ends of the flexible strips extend substantially above the upper edge of the form, whereby the uppermost ends of the strips can be engaged by the mechanical feed means to facilitate properly positioning the uppermost form in the printer.

7 Claims, 2 Drawing Sheets

FIG. 1
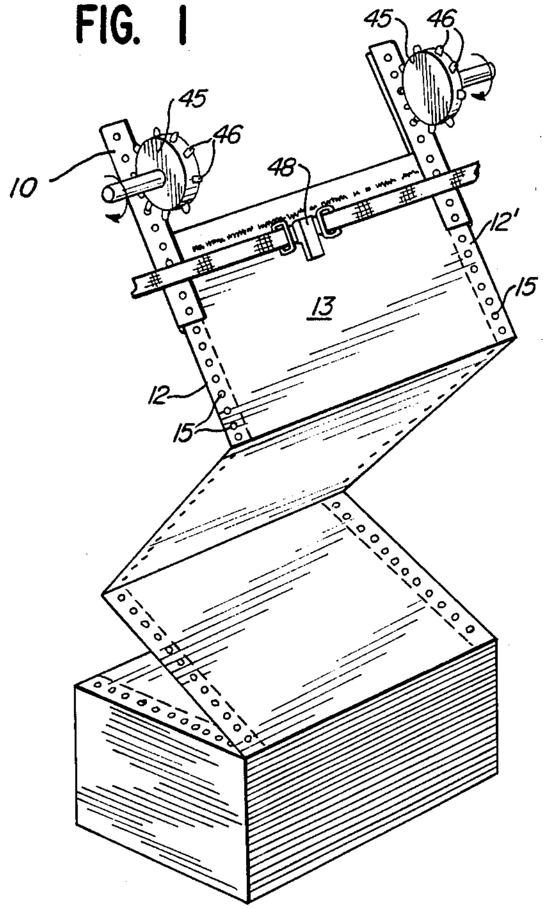
FIG. 4
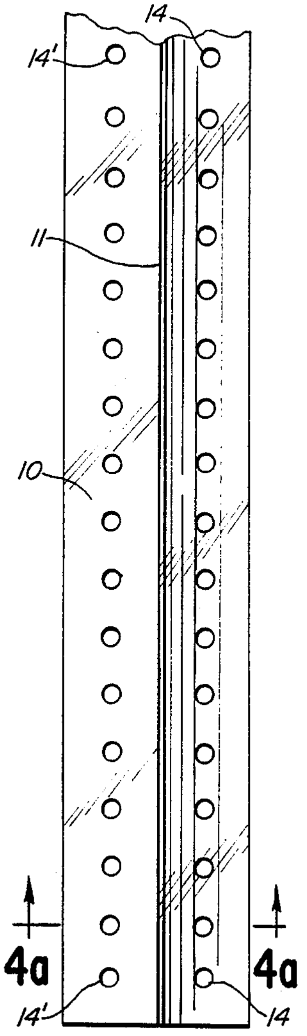
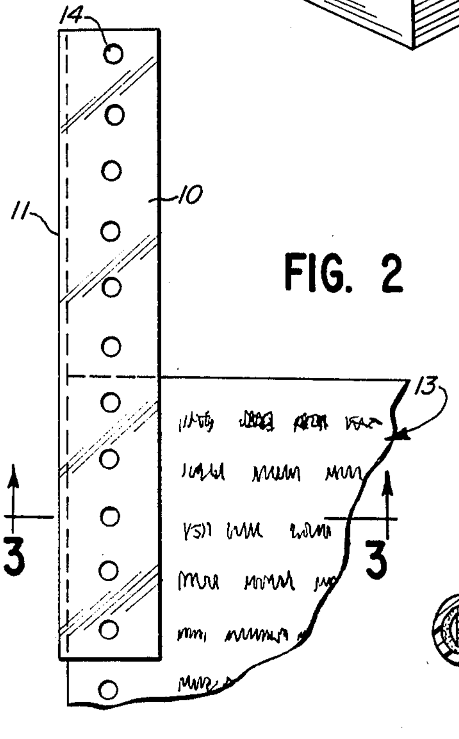
FIG. 2
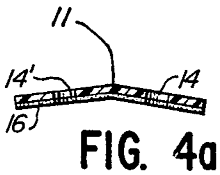
FIG. 4a
FIG. 3
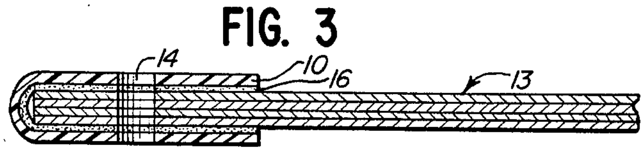

FIG. 5
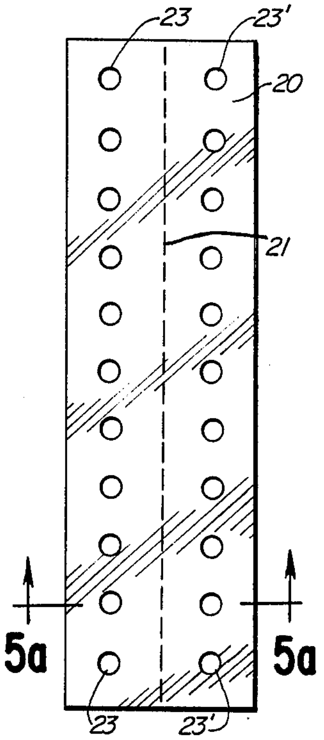
FIG. 6
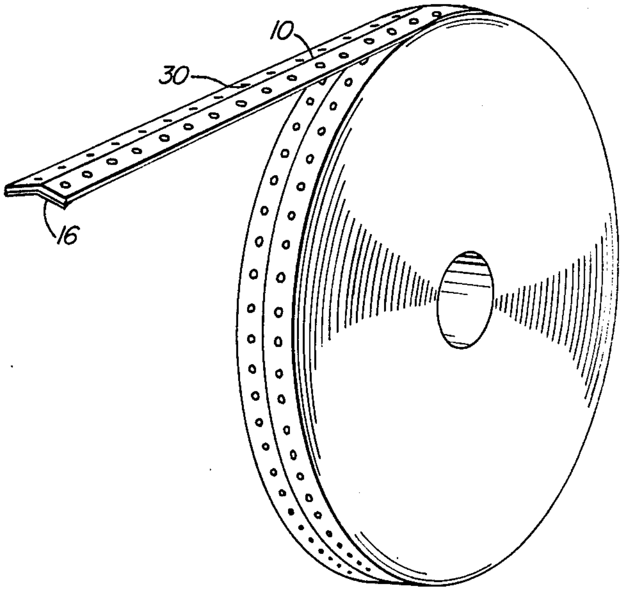
FIG. 5a
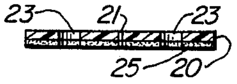
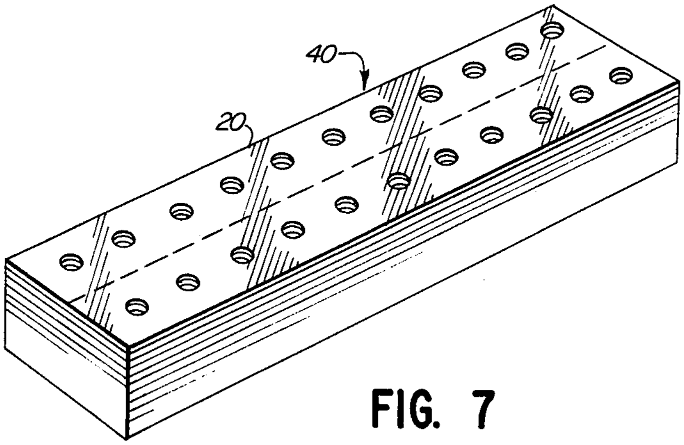
FIG. 7

PRINTING FORM FEEDER DEVICE AND METHOD

This application is a continuation of application Ser. No. 523,133 filed Aug. 15, 1983, now abaondoned.

The present invention relates generally to processing continuous form assemblies in a printer and more particularly to an improved method and means for feeding a continuous form assembly into an automatic printer mechanism.

A continuous form assembly typically comprises several superimposed interconnected sheets or forms on which information is printed, preferably by a high speed computer controlled mechanism, to provide multiple copies of each printed form. The forms are scored at the upper and lower edges to facilitate separating into individual sets. The assembly of forms also has along each lateral edge a narrow detachable margin section provided at the midpoint thereof with equally spaced perforations adapted to be engaged by the drive mechanism of the printer's tractor mechanism for advancing the set of forms through the printer. The marginal sections are adapted to be removed from the set of forms after passing through the printer mechanism.

In a conventional computer controlled printer mechanism the printer tractor means is comprised of a drive mechanism having feed pins at each end which engage the perforations in the margin sections of the forms. At least one of the drive mechanisms for advancing the forms extends substantially above the printing head, and as a result the upper portion of the first set of forms (i.e. uppermost form) of the continuous form assembly must be advanced some distance past the printing head before the feed pins can engage with the perforations in the marginal section of the form and the uppermost form of the assembly is not in proper position to receive all of the required printing thereon and must be discarded. Where it is necessary to frequently use several different continuous form assemblies during a work period, the waste and inconvenience of accounting for discarded forms is an undesirable business expense.

The prior art continuous form leaders disclosed in U.S. Pat. Nos. 3,788,536 and 4,070,223 are designed to avoid wasting the first form of a continuous form assembly and provide inverted Y-shaped members or sections of flexible material having their upper end portions bonded together and their low end portions separable to form depending legs which are adapted to hold the margins of the uppermost form between the lower ends so that the upper ends comprise extensions of the uppermost form which can be inserted into a mechanical printer. These prior art form leaders are relatively expensive to produce and/or are inconvenient to use, because of the amount of manipulation required to properly mount the strips on the uppermost form.

It is, therefore, an object of the present invention to provide an improved continuous business form assembly feeders device and method of feeding a continuous form assembly into printer mechanism.

Other objects of the invention will be apparent from the following description and claims when read in conjunction with the accompanying drawing wherein:

FIG. 1 is a schematic perspective view of a continuous form printer and the uppermost form of a continuous business form assembly positioned in a printer mechanism by means of the feeder device of the present invention;

FIG. 2 is an enlarged fragmentary plan view of the uppermost continuous form assembly having the feeder device of the present invention mounted thereon;

FIG. 3 is a vertical sectional view along the line 3—3 of FIG. 2;

FIG. 4 is a fragmentary top plan view of one embodiment of the feeder device of the present invention;

FIG. 4*a* is a vertical sectional view taken along the line 4*a*—4*a* of FIG. 4;

FIG. 5 is a fragmentary top plan view of a further embodiment of the feeder device of the present invention;

FIG. 5*a* is a vertical sectional view taken along the line 5*a*—5*a* of FIG. 5;

FIG. 6 is a perspective view of the feeder device of FIGS. 4 and 4*a* in the form of a continuous strip wound into roll from which a suitable length of the feeder device can be removed as required; and FIG. 7 is a perspective view of an assembly of feeder devices of FIGS. 5 and 5*a* in the form of a pad from which a feeder device can be removed as required.

The foregoing objects and other advantages inherent in the present invention are achieved by providing an article in the form of a flexible strip foldable longitudinally down the middle and each half of the strip provided with oppositely disposed perforations spaced vertically so as to be engagable by the feed pins of a printer tractor mechanism. One surface of the strip is provided with an adhesive material which enables the strip to be secured to the margin section when folded to enclose both the front and rear surfaces of a portion of the margin section of the uppermost form of a continuous form assembly.

In the embodiment of the present invention which is shown in FIGS. 1 through 4*a*, the feeder device or margin extender is formed of an elongated flexible strip 10 of paper, plastic or metal which is creased longitudinally as at 11 along the middle thereof to facilitate folding the flexible strip longitudinally. The strip has a width such that when folded longitudinally in half it has substantially the same width as each of the margin sections 12, 12′ of the uppermost form 13. Each half of the flexible strip 10 at the midpoint thereof is provided with oppositely disposed feed pin holes 14, 14′ which are spaced longitudinally a distance equal to the spacing of the feed pin holes 15 in the margin sections 12, 12′ of the form and the feed pins of the printer tractor mechanism. The lower surface of the foldable strip 10 is coated with an adhesive film 16, preferably a long tack pressure sensitive adhesive, so that the strip can be secured to the margin section of the uppermost form when brought into contact therewith.

In the modified form of the margin extender or feeder device shown in FIG. 5 and 5*a* the flexible strip 20 is formed substantially as in FIGS. 4 and 4*a* except that instead of having the strip creased longitudinally the strip 20 is cut at intermittant points spaced longitudinally along the center thereof as at 21 to provide a line of weakness extending longitudinally down the middle to facilitate folding the flexible strip 20. The strip 20 is provided with oppositely disposed perforations 23, 23′ at midpoint of each half and the perforations are spaced longitudinally so as to coincide with the spacing of the feed pin holes 15 of the margin sections 12, 12′. An adhesive film 25 is provided on the lower surface of the flexible strip 20, as in the embodiment of the FIGS. 4 and 4*a*.

The flexible strips of the present invention while in a substantially flat or unfolded configuration can be wound into a roll or onto a spool from which sections of the flexible strip can be removed having any required length (See FIG. 6). If desired, transverse perforations 30 can be made at spaced intervals to facilitate removal of a section of the continuous strip from the roll. Also, several margin extenders 20 having the proper length for a given form can be provided in the form of a pad 40 from which an individual feeder device 20 can be removed as required (See FIG. 7). In the latter embodiment the adhesive material on one surface of the flexible strip should preferably be a long tack pressure sensitive adhesive.

In use a section of the longitudinally foldable flexible strip of the present invention having [a width about twice the width of the margin section and] a length, preferably about one-half to one times the length of the uppermost form, sufficient to permit the lower end portions thereof to be secured to the upper end portion of a margin section of the uppermost form and also extend substantially above the upper edge of the form, is positioned preferably on each of the margin sections of the uppermost form by aligning the fold-line of each flexible strip with the lateral edge of one of the margin sections and the perforations or feed pin holes formed in the lower end portion in one half of the generally flat unfolded strip coincide with the feed pin holes in the upper end portion of the margin section of the uppermost form. When the fold-line and feed pin holes of the one half of the strip and margin section are thus properly aligned, the one-half of the flexible strip is moved into contact with one surface of the margin section and the other half folded inwardly so as to enclose the margin section of the uppermost form and securely hold all of the sheets of the uppermost form and securely hold all of the sheets of the uppermost form against movement relative to the flexible strips. The uppermost form having the lower ends of the flexible strips secured to each margin section with the upper ends of the folded flexible strips extending longitudinally substantially above the uppermost edge thereof is inserted into the mechanical printer by feeding the upper ends of the flexible strips into the tractor mechanism 45 of the mechanical printer until the feed pins 46 engage the feed pin holes 15 of the flexible strips and the uppermost form is advanced so that the printer head 48 can apply the required printing on any portion of the uppermost form.

While the flexible strips of the specific embodiments of the present invntion have perforations in the form of circular feed pin holes, any feed means can be used for the flexible strips which are compatible with the feed mechanism of the printer and the continuous form assembly.

I claim:

1. A method of feeding into a mechanical printer the uppermost form of a continuous assembly of forms having along each lateral edge of said forms narrow detachable margin sections removable from said forms with said margin section having longitudinally spaced perforations engagable by mechanical feed means of a printer comprising:

(1) providing for each detachable margin section of said uppermost form an elongated unitary flexible strip of sheet material having when folded a width substantially equal to the width of said detachable margin section with a fold-line extending longitudinally down the middle thereof, each half of said flexible strip having at the midpoint thereof oppositely disposed perforations which are longitudinally aligned and spaced to permit alignment therof with the perforations in said detachable margin sections and said flexible strip being adherent to the front and rear surfaces of said form;

(2) mounting a said flexible strip on each said margin section by aligning the fold-line of a said flexible strip with the lateral edge of one of said margin sections and the perforations in a lower end portion of one half of one said flexible strip with the perforations on an upper end portion of one of said detachable margin sections of said uppermost form and moving said one half into contact with said upper end portion of said margin section;

(3) folding the other half of said flexible strip inwardly along said fold-line to enclose the lateral edge and upper and lower surfaces of said upper end portion of said detachable margin section so as to be removable from said form with said margin section and and form a unitary flexible extension section adhesively secured to said margin section with the upper end portion of said extension section extending longitudinally substantially above the upper edge of said uppermost form; and (4) inserting said upper end portion of each flexible extension section into said mechanical feed means to effect engagement between the perforations therein and said mechanical feed machanism;

whereby said uppermost form is movable by said mechanical feed means into printing position without impairing the utility of any portion of said uppermost form of the continuous form assembly.

2. A method as in claim 1, wherein the said fold-line is provided in said strip by forming perforations at space points longitudinally down the middle of said strip.

3. A method as in claim 1, wherein the said fold-line is provided in said strip by forming a crease line longitudinally down the middle of said strip.

4. An article for feeding into a mechanical printer the uppermost form of a continuous assembly of forms having along each lateral edge a narrow detachable margin section with longitudinally spaced perforations adapted for engagement by a mechanical feed mechanism of a mechanical printer comprising; a flexible strip of material having when folded a width substantially equal to the width of said detachable margin section and provided with a longitudinal foldline down the middle thereof, each half of the said flexible strip having at the midpoint thereof oppositely disposed perforations of a size and longitudinal spacing which coincide with said perforations in the detachable margin section of said form, and said flexible strip having one surface thereof coated with an adhesive material adapted to adhere to the front and rear surfaces of said detachable margin section when said flexible strip is folded over a said detachable margin section with a lower end section of said folded flexible strip enclosing the upper end portion of said detachable margin section of said uppermost form so as to be removable with said margin section when said margin section is detached from said form with the perforations in said flexible strip coinciding with the perforations in said detachable margin section; whereby said flexible strip provides a longitudinal extension of said detachable margin section for engagement by said feed mechanism of said printer.

5. An article as in claim 4, wherein said fold-line in said flexible strip is in the form of closely spaced longitudinal perforations extending longitudinally down the middle thereof.

6. An article as in claim 4, wherein said fold-line in said flexible strip is in the form of a crease extending longitudinally down the middle thereof.

7. A continuous assembly of forms having along each lateral edge thereof a detachable margin section with longitudinally spaced perforations adapted to be engaged by mechanical feed means of a mechanical printer;

said detachable margin sections of the uppermost form of said assembly each having mounted thereon a flexible strip of sheet material having when folded a width substantially equal to the width of said detachable margin section and having a foldline extending longitudinally down the middle with each half of said flexible strip having at the midpoint thereof oppositely disposed perforations spaced longitudinally a distance equal to the spacing of the perforations in said detachable margin section and said flexible strip having on the inner surface thereof a coating of adhesive material adherent to said margin section;

said flexible strip having a lower end portion therof folded longitudinally about an upper portion of said detachable margin section of said uppermost form so as to be removable from said form with said margin section when said margin section is detached from said form and said flexible strip adhesively engaging said upper portion of said margin section with the perforations in said flexible strip coinciding with the perforations in said detachable margin sections, and, said flexible strip after being folded and adhesively engaging said upper end portion of said margin section forming a longitudinal extension section extending substantially above the upper edge of said uppermost form and adapted to be engaged by said mechanical feed means and move said uppermost form into printing position without impairing the utility of any portion of said uppermost form of the continuous form assembly.

* * * * *